(12) United States Patent
Song et al.

(10) Patent No.: US 8,498,079 B1
(45) Date of Patent: Jul. 30, 2013

(54) SUPERIOR PERFORMANCE HEAD DESIGN WITH MINIMIZED ATE AND WATE

(75) Inventors: Suping Song, Fremont, CA (US); Yuhui Tang, Milpitas, CA (US); Tai Min, San Jose, CA (US); Lijie Guan, Milpitas, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 13/620,760

(22) Filed: Sep. 15, 2012

(51) Int. Cl.
*G11B 5/127* (2006.01)

(52) U.S. Cl.
USPC ............................................. 360/125.3

(58) Field of Classification Search
USPC ............... 360/125.3, 125.31, 125.14, 125.74, 360/125.06, 123.01, 123.03, 122
See application file for complete search history.

(56) References Cited

U.S. PATENT DOCUMENTS

| | | | | |
|---|---|---|---|---|
| 7,889,456 | B2 * | 2/2011 | Jiang et al. | 360/125.08 |
| 8,231,796 | B1 * | 7/2012 | Li et al. | 216/22 |
| 8,238,059 | B1 | 8/2012 | Tang et al. | |
| 8,400,733 | B2 * | 3/2013 | Shin et al. | 360/125.15 |
| 2007/0025018 | A1 * | 2/2007 | Lim et al. | 360/125 |
| 2007/0217069 | A1 * | 9/2007 | Okada et al. | 360/126 |
| 2011/0097601 | A1 * | 4/2011 | Bai et al. | 428/815 |
| 2012/0052327 | A1 | 3/2012 | Chang et al. | |
| 2012/0063032 | A1 | 3/2012 | Meloche et al. | |
| 2012/0125886 | A1 * | 5/2012 | Hong et al. | 216/22 |

OTHER PUBLICATIONS

"Anomalous Temperature Dependence of the Magnetocrystalline Anisotropy in Dilute Cobalt Iron Alloys," by Minoru Takahashi et al., Journal of Phys. Soc. Japan, Letters, vol. 48, No. 4, Apr. 1980, pp. 1391-1392.
"Crystal Magnetic Anisotropy and Magnetization of MnSb," by Toshimichi Okita et al., Journal of the Physical Society of Japan, vol. 25, No. 1, Jul. 1968, pp. 120-124.
"Influence of 5d transition elements on the magnetocrystalline anisotropy of hep-Co," J. Phys: Condens, Matter 11 (1999), by Nobuaki Kikuchi et al., L485-L490, Nov. 1, 1999.
"A soft magnetic underlayer with negative uniaxial magnetocrystalline anisotropy for suppression of spike noise and wide adjacent track erasure in perpendicular recording media," Journal of Applied Physics, 99 08Q907, Apr. 2006, pp. 1-3.
"A novel crystalline soft magnetic intermediate layer for perpendicular recording media," by Soyoung Park et al., Journal of Applied Physics 105, 07B723, Apr. 2009, pp. 1-3.
"Co-7% Ir Soft Magnetic Intermediate Layer for Perpendicular Media," by Soyoung Park et al., IEEE Transactions on Magnetics, vol. 46, No. 6, Jun. 2010, pp. 2278-2281.
"Magnetocrystalline Anisotropy for a'—Fe—C and a'—Fe—N Films," by Migaku Takahashi et al., IEEE Transactions on Magnetics, vol. 37, No. 4, Jul. 4, 2001, pp. 2179-2181.

* cited by examiner

*Primary Examiner* — Allen T Cao
(74) *Attorney, Agent, or Firm* — Saile Ackerman LLC; Stephen B. Ackerman (57) ABSTRACT

A PMR writer is disclosed with an all wrap around design wherein the leading shield, side shields, and composite trailing shield are comprised of an anisotropic (-Ku) magnetic layer, and where the leading shield and side shields adjoin a gap layer. The composite shield has a first layer made of an isotropic magnetic material adjoining the write gap, and the anisotropic (-Ku) layer adjoins the first trailing shield layer on a side opposite the write gap. The main pole may have a tapered leading side and a tapered trailing side with the anisotropic (-Ku) leading shield and trailing shield layers extending a greater distance from the ABS than the ends of the tapered main pole sides. Adjacent track erasure is minimized while on-track write field and field gradient are improved.

31 Claims, 7 Drawing Sheets

SUPERIOR PERFORMANCE HEAD DESIGN WITH MINIMIZED ATE AND WATE

RELATED PATENT APPLICATION

This application is related to U.S. Pat. No. 8,238,059, assigned to a common assignee and herein incorporated by reference in its entirety.

TECHNICAL FIELD

The present disclosure relates to a magnetic shield structure adjoining a main pole along an air bearing surface (ABS) in a write head wherein the write shield, leading shield, and side shields are comprised of a magnetic material with a c-axis formed perpendicular to the ABS and with a negative crystalline anisotropy energy constant (−Ku) at room temperature to minimize adjacent track erasure (ATE) and wide area track erasure (WATE) during a write process.

BACKGROUND

In today's perpendicular magnetic recording (PMR) technology, an all wrapped around (AWA) shield writer is widely used by the major hard disk drive (HDD) manufacturers. The function of a trailing shield in an AWA structure is to improve the magnetic field gradient along a down track direction which is a key requirement for high bits per inch (BPI). Meanwhile, side shields and a leading shield serve to define a narrower writer bubble which is important for realizing higher tracks per inch (TPI). In order to achieve higher area density (i.e. higher BPI and TPI) in advanced writer designs, the gap between the main pole and all shields, including the write gap adjoining the trailing shield, side gaps to the side shields, and lead gap next to the leading shield must be as narrow as possible. The material used for conventional AWA shields is a soft magnetic material without preferred anisotropy. As a result, narrowing the gap between a shield and main pole will only lead to an unwanted flux path from the main pole to the shield which in turn reduces the writability (magnetic field) of the writer on magnetic recording media. This dilemma is considered a significant challenge to improving current writer designs and performance. Furthermore, ATE and WATE are known to be largely induced with increasing write current frequency. It is expected that the aforementioned types of erasures will be a major problem for future ultra-high data rate products.

Conventional write heads have a shield structure that does not adequately address the issues of controlling the magnetic flux path for better writability and minimizing ATE and WATE to enable improved performance in advanced writer designs. Therefore, an improved magnetic shield structure is required that minimizes flux loss from the main pole to surrounding shields, and reduces ATE and WATE in ultra-high density writer designs.

SUMMARY

One objective of the present disclosure is to provide a magnetic shield composition and design wherein ATE and WATE are significantly minimized to enable improved performance in ultra-high area density PMR writers.

A second objective of the present disclosure is to provide a magnetic shield structure according to the first objective that also improves the on-track field and field gradient.

According to the embodiments of the present disclosure, the first and second objectives are achieved with an AWA shield structure wherein each of the write shield, side shields, and leading shield at the ABS are comprised of a magnetic material with a negative crystalline anisotropy energy constant (−Ku) at room temperature. The trailing shield preferably has a first layer made of a high moment material having a first side that interfaces with the write gap, and a second layer made of an anisotropic (−Ku) magnetic material that adjoins the first layer along a second side that is opposite the first side. The c-axis in the (−Ku) magnetic layers in the shields is formed perpendicular to the ABS. As a result, magnetization in the portion of the shield structure comprised of anisotropic (−Ku) magnetic material can only be induced in a direction toward the ABS with a strong magnetic field thereby reducing the tendency for the shield structure to cause wide area track erasure or adjacent track erasure in the magnetic medium during a write process. Furthermore, the anisotropic (−Ku) shield structure is totally soft in a 2D plane orthogonal to the hard axis which means the magnetization of the anisotropic (−Ku) layers in each shield can be easily induced in any direction orthogonal to the hard axis with a weak magnetic field. The anisotropic (−Ku) magnetic material typically has a 12 kG magnetic content while the first section of the trailing shield preferably has a 24 kG magnetic content. As a result, the trailing shield retains the capability to effectively function as the magnetic flux return pathway.

In a first embodiment, the main pole has a tapered leading side and a tapered trailing side, and the shield structure is an AWA design that completely surrounds the main pole near the ABS including the tapered trailing and leading sides. A leading gap adjoins the tapered leading side, a write gap adjoins the tapered trailing side, and side gaps are formed along sides of the main pole proximate to the ABS. A leading shield made of an anisotropic (−Ku) magnetic material has a first side that interfaces with the leading gap, a second side along the ABS, and a third side formed parallel to the ABS and connected to an end of the leading gap at a first distance from the ABS. Side shields made of the same anisotropic (−Ku) magnetic material are formed adjacent to the side gaps. A first layer of a trailing shield structure made of a 24 kG magnetic material adjoins the side of the write gap that faces away from the main pole tapered trailing side at the ABS. The first trailing shield layer also extends towards a back end of the main pole and is formed parallel to a tapered trailing side of the main pole. A second trailing shield layer is comprised of an anisotropic (−Ku) magnetic material with a first side facing the main pole trailing side and interfacing with the first trailing shield layer, a second side formed along the ABS, and a third side formed parallel to the ABS and connected to an end of the first side of the second trailing shield layer at a second distance from the ABS. The second trailing shield layer has a fourth side facing away from the main pole trailing side that is orthogonal to the ABS and interfaces with a magnetic layer known as a return pathway.

In a second embodiment, the main pole, side shield, and leading shield features are retained from the first embodiment. However, the size of the first (24 kG) trailing shield section is reduced such that an end opposite the ABS is coplanar with the third side of the second trailing shield section at a second distance from the ABS. The second distance is preferably greater than the distance of an end of the tapered trailing side from the ABS. The second trailing shield portion made of anisotropic (−Ku) magnetic material has essentially the same shape and location as in the first embodiment.

The anisotropic (−Ku) magnetic material may be comprised of hcp-CoIr wherein the Ir content is 10 to 40 atomic %, and preferably between 17 and 22 atomic %, dhcp-CoFe, a'-Fe—C, or NiAs-type $Mn_{50}Sb_{50}$. The down-track thickness of the anisotropic (-Ku) leading shield layer is from 200 to 800 nm. The down-track thickness of the anisotropic (-Ku) trailing shield section is from 300 to 800 nm. Side shields and leading shield extend a distance of 100 to 500 nm from the ABS while trailing shield extends 150 to 500 nm from the ABS.

BRIEF DESCRIPTION OF THE DRAWINGS

FIG. 7a is an ABS view of the PMR writer structure shown in FIG. 6a while

FIG. 9 is a plot illustrating down-track field profiles for the PMR writer structures depicted in FIG. 4, FIG. 6a, and FIG. 8a.

FIGS. 10-11 show ATE profiles for the PMR writer structures depicted in FIG. 4, FIG. 6a, and FIG. 8a.

DETAILED DESCRIPTION

The present disclosure is an AWA shield structure in a PMR writer which takes advantage of the discovery that an anisotropic (-Ku) magnetic material may be used as a shield layer to minimize adjacent track erasure and wide area track erasure while providing an improved on-track write field and field gradient. Although the exemplary embodiment depicts a trapezoidal shaped main pole at the ABS, the present disclosure also encompasses other main pole shapes. Furthermore, the main pole may not be tapered, or may have one or both of a tapered trailing edge and a tapered leading edge. Width in the context of shield structures and layers defined herein refers to a distance in a cross-track direction, and thickness or depth relates to a distance in a down-track direction. Shields are described as being made of a 16 kG or 24 kG magnetic layer, for example, which refers to the saturation magnetization or Bs of the magnetic layer.

Figure 1:
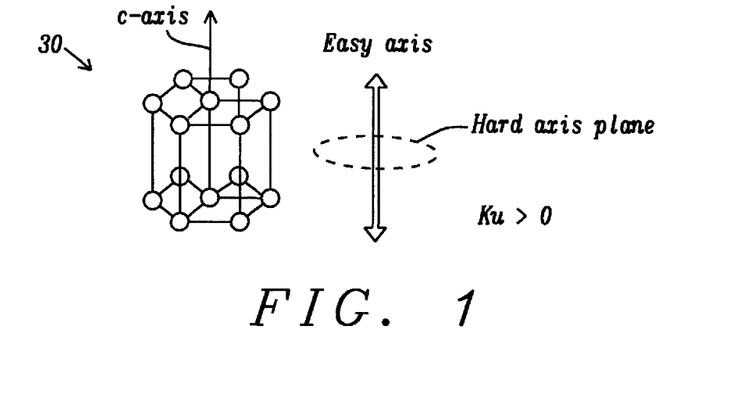
FIG. 1 depicts a hexagonal crystal structure with a crystalline anisotropy energy constant (Ku)>0 and having a c-axis aligned with an easy axis direction.

Referring to FIG. 1, most single crystal magnetic materials have a magnetic energy which is anisotropic due to the crystalline structure. Normally, the anisotropy energy constant hereafter referred to as Ku is positive which means the magnetic energy is lowest with a magnetization direction along the c-axis as shown for crystal 30. In the absence of an external field, magnetization is aligned with the c-axis which is defined as the easy axis, and the plane orthogonal to the c-axis is defined as the hard axis plane.

Figure 2:
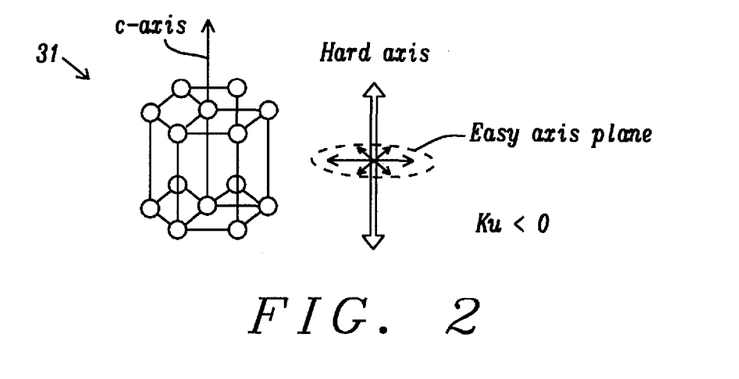
FIG. 2 depicts a hexagonal crystal structure with a crystalline anisotropy energy constant (Ku)<0 and having a c-axis aligned with a hard axis direction.

When the crystalline anisotropy energy is negative (Ku<0) as illustrated for crystal 31 in FIG. 2, the magnetic energy in the absence of a magnetic field is highest along the c-axis which represents the hard axis. Thus, the plane orthogonal to the c-axis is the easy axis plane. As a result, the magnetization of a hexagonal crystal magnetic material with a negative Ku value, hereafter referred to as an anisotropic (-Ku) magnetic material, can be rotated to the direction of the c-axis only with a large magnetic field.

Figure 3:
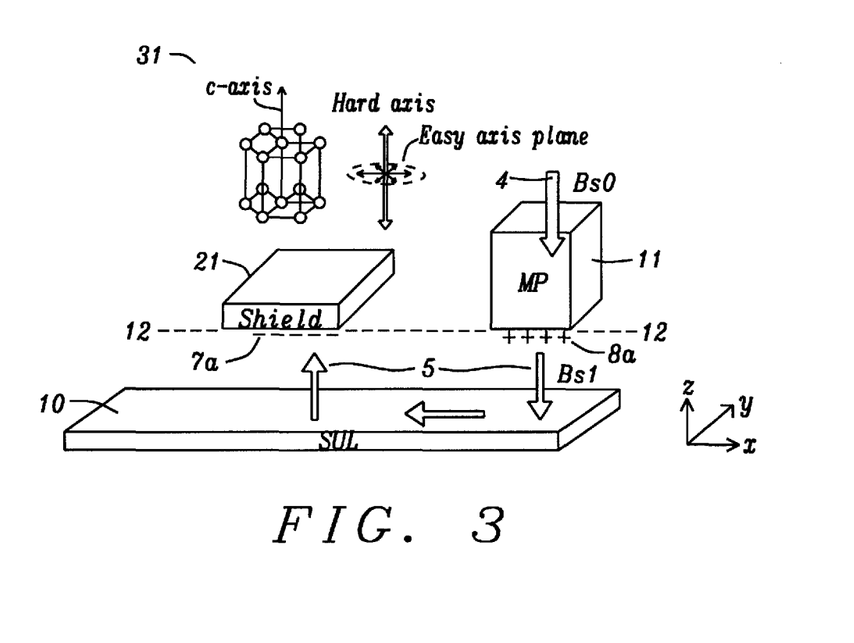
FIG. 3 is an oblique view of a PMR writer wherein a shield is made of an anisotropic (-Ku) magnetic material having a hard axis aligned in a direction toward the ABS to minimize ATE and WATE.

Referring to FIG. 3, a shield 21 made of an anisotropic (-Ku) magnetic material and with a plurality of crystals 31 and a hard axis aligned in the z-axis direction (perpendicular to the ABS) is shown with a bottom surface along an ABS 12-12. A main pole 11 is formed in an x-axis direction from the shield 21 and is separated therefrom by gap 3. Note that the c-axis of each hexagon crystal 31 is pointing toward the magnetic medium 10 that has a soft underlayer (SUL) containing a plurality of magnetic bits (not shown). Magnetic flux 4 is generated by coils (not shown) and there is a Bs0 component within the main pole, and a Bs1 component that exits the main pole at the ABS and passes into the magnetic medium. Magnetic charges 7a at the ABS along the shield 21 and magnetic charges 8a at the ABS along the main pole are formed during a write process to facilitate the desired flow 5 of flux from the main pole 11 into the magnetic medium 10, and then returning into the shield 21. The magnetization direction of the shield 21 may be induced orthogonal to the hard axis by a weak magnetic field which has a magnitude less than about 20 Oe. We previously disclosed various shield structures based on an anisotropic (-Ku) magnetic layer in U.S. Pat. No. 8,238,059.

Figure 4:
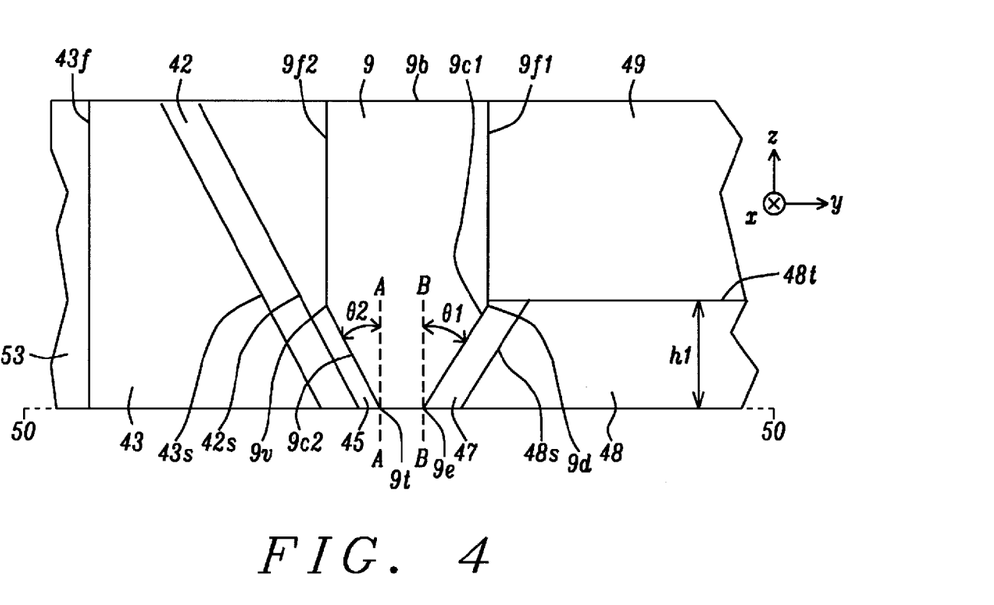
FIG. 4 is a down-track cross-section of a PMR writer previously fabricated by the inventors and includes a composite trailing shield having a 24 kG magnetic layer along a tapered trailing main pole side, and a second layer comprised of an low moment magnetic material formed on a trailing side of the 24 kG layer.

Referring to FIG. 4, a shield structure formed around a main pole layer at an ABS is depicted according to an existing process of record (POR) practiced by the inventors. The y-axis is the down-track direction, the x-axis is the cross-track direction, and the z-axis is formed perpendicular to the ABS 50-50 and extends towards a back end 9b of the main pole 9. The main pole has a leading edge 9e at the ABS and a tapered leading side 9c1 that extends from the leading edge at an angle θ1 with respect to the z-axis direction (plane B-B) to a point 9d where the tapered leading side connects with the main pole top surface 9f1 that is preferably formed parallel to plane B-B. There is a tapered trailing side 9c2 of the main pole that extends from a trailing edge 9t at the ABS to a point 9v where the tapered trailing side connects with the main pole bottom surface 9f2. Bottom surface 9f2 is preferably formed parallel to the z-axis direction. The tapered trailing side is formed at an angle θ2 with respect to the z-axis direction (plane A-A). The write gap 45 is made of a non-magnetic material and adjoins the tapered trailing side and the bottom surface of the main pole.

The trailing shield is comprised of a high moment, 24 kG shield layer 42 that has a first side 42s which interfaces with the write gap 45 and is formed parallel to the tapered trailing side 9c2. According to the exemplary embodiment, the thickness of the 24 kG shield layer is constant in a down-track direction as the distance between the first side and the ABS increases. The trailing shield also includes a second layer 43 that is a comprised of a low moment material such as a 16 kG magnetic layer. The second trailing shield layer has a side 43s facing the main pole that interfaces with the high moment shield layer. Both trailing shield layers 42, 43 have a side formed along the ABS 50-50. Moreover, the second shield layer has a third side 43f formed perpendicular to the ABS wherein the third side adjoins a return path layer 53 that serves as a pathway for magnetic flux to flow to a back end of the write head. Write gap 45 and return path layer 53 also have a side formed along the ABS 50-50.

There is a leading gap layer hereafter referred to as leading gap 47 that is comprised of a non-magnetic material with one side at the ABS, a second side adjoining the tapered leading side 9c1, and a third side formed parallel to the ABS 50-50 at a distance h1 from the ABS where h1 is from 100 to 500 nm. The present disclosure also anticipates the leading gap may extend beyond point 9d in a z-axis direction and contact a section of the main pole along top surface 9f1. The leading shield 48 is made of an anisotropic (-Ku) magnetic material having one side along the ABS, a second side 48s formed parallel to the tapered leading edge 9c1, and a third side 48t that is parallel to the ABS and a distance h1 therefrom. The leading shield has a c-axis that is formed perpendicular to the ABS and is also the hard axis direction for crystals within the anisotropic (-Ku) magnetic layer. The leading shield may be comprised of hcp-CoIr wherein the Ir content is from 10 to 40 atomic %, and preferably between 17 and 22 atomic %, dhcp-CoFe, a'-Fe—C, or NiAs-type $Mn_{50}Sb_{50}$. A non-magnetic layer 49 adjoins side 48t and also interfaces with the main pole top surface 9f1.

Figure 5:
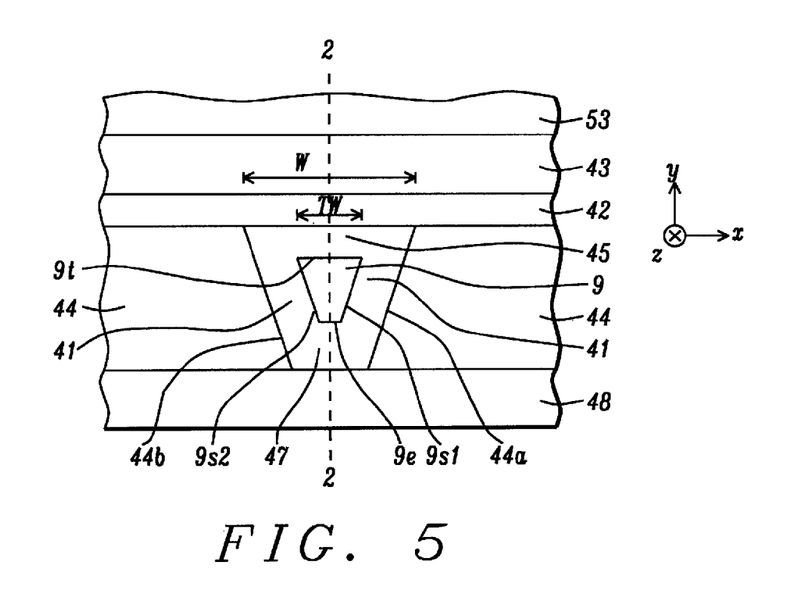
FIG. 5 is an ABS view of the PMR writer structure depicted in FIG. 4.

In FIG. 5, an ABS view of the POR shield structure from FIG. 4 is shown. Note that the cross-section in FIG. 4 is obtained along the plane 2-2 in FIG. 5. The main pole shape at the ABS is depicted as a trapezoid wherein the leading edge 9e has a smaller width in a cross-track (x-axis) direction than the trailing edge 9t. Track width TW is defined as the width of the main pole trailing edge. Sloped sides 9s1, 9s2 of the main pole are adjoined by a side gap 41 made of a non-magnetic material. Main pole 9 may include a seed layer (not shown) along sides 9s1, 9s2 and along leading edge 9e that facilitates a deposition method wherein main pole material is plated in an opening bounded by side gaps 41 and lead gap 47. In the exemplary embodiment, the side gap has a uniform width in the x-axis direction and conforms to the shape of the sides 9s1, 9s2. The write gap 45 has a width w where w>TW and adjoins a top surface of each side gap 41 to form a continuous gap layer around the main pole. However, the thickness along the plane 2-2 is typically less for the write gap 45 than for leading gap 47. The write gap may be comprised of the same non-magnetic material as in the side gap and leading gap. Leading gap 47 adjoins a bottom surface of each side gap.

The shield structure is shown with an all wrap around (AWA) design wherein side shields 44 have a top surface that adjoins a bottom surface of the first trailing shield section 42, and the side shields have a bottom surface that interfaces with leading shield 48. The side shields are typically comprised of a 16 kG magnetic material. Trailing shield sections 42, 43 as well as side shields 44 are made of an isotropic magnetic material such as NiFe or CoNiFe. Note that the side shields adjoin side gap 41 on either side of main pole 9, and leading shield 48 interfaces with leading gap 47 and side shields. In one embodiment, side 44a is aligned essentially parallel to main pole side 9s1, and side 44b is aligned essentially parallel to main pole side 9s2. While the POR shield structure in FIG. 5 does have an advantage in terms of lower ATE and lower WATE than a similar structure wherein all of the shields including the leading shield are made of a conventional 16 kG, 19 kG, or 24 kG material, there is still a need to further reduce ATE and WATE.

We have found that by including an anisotropic (-Ku) magnetic material in all shields in an AWA shield structure, ATE and WATE are substantially reduced compared with shield structures currently employed in write head designs. It should be understood that an anisotropic (-Ku) hcp-CoIr layer has a Bs of around 12 kG and cannot function effectively as a trailing shield by itself. Therefore, the preferred embodiments of the present disclosure include a high moment trailing shield layer between the write gap and an anisotropic (-Ku) magnetic layer in the trailing shield.

Figure 6A:
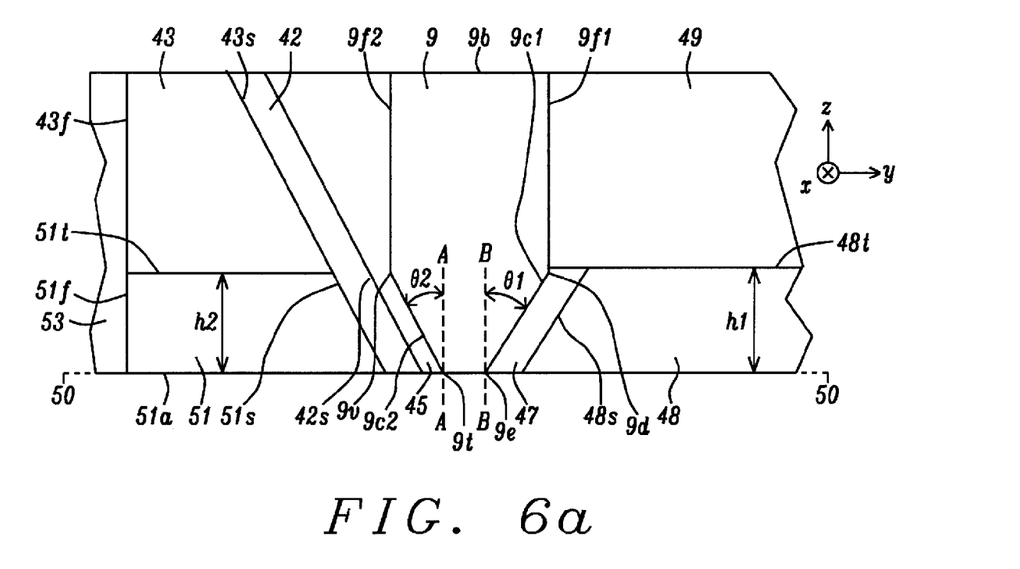
FIG. 6a is a down-track cross-section of a PMR writer formed according to a first embodiment of the present disclosure wherein a leading shield, side shields, and a composite trailing shield surrounding a main pole are all comprised of an anisotropic (-Ku) magnetic material.

Referring to FIG. 6a, a first embodiment of the present disclosure is illustrated from a down-track cross-sectional view. Several features including the leading shield 48, leading gap 47, main pole 9, write gap 45, and first trailing shield portion 42 are retained from the inventor's POR design in FIGS. 4-5. One key feature of this embodiment is the composite trailing shield that has an anisotropic (-Ku) magnetic layer 51 with a first side 51a formed along the ABS 50-50, a second side 51f that adjoins the return path magnetic layer 53 and extends a distance h2 of 150 to 500 nm from the ABS, and a third side 51t formed parallel to the ABS at a distance h2. The anisotropic (-Ku) magnetic layer has a fourth side 51s that interfaces with the first trailing shield section 42 and is formed parallel to tapered trailing side 9c2. Thus, the aforementioned four sides define the shape of the anisotropic (-Ku) magnetic layer in the composite trailing shield at the ABS. As a result, the composite trailing shield has three layers with a first high moment layer 42, a second layer 43, and a third anisotropic (-Ku) layer 51 wherein the second layer 43 is bounded in part by sides 43s and 43f as described previously, and by side 51t. In other words, the second trailing shield layer as originally described with respect to FIG. 4 is modified to replace the portion between the ABS 50-50 and side 51t that is now filled with the anisotropic (-Ku) magnetic layer.

All anisotropic (-Ku) layers including layers 48, 51, and side shields 55 (FIG. 7a) have a hard axis formed perpendicular to the ABS. According to one embodiment, the h1 distance is greater than a distance of the end 9d of the tapered leading side from the ABS 50-50. Moreover, in the exemplary embodiment, the h2 distance is greater than a distance of the end 9v of the tapered trailing side from the ABS.

Figure 6B:
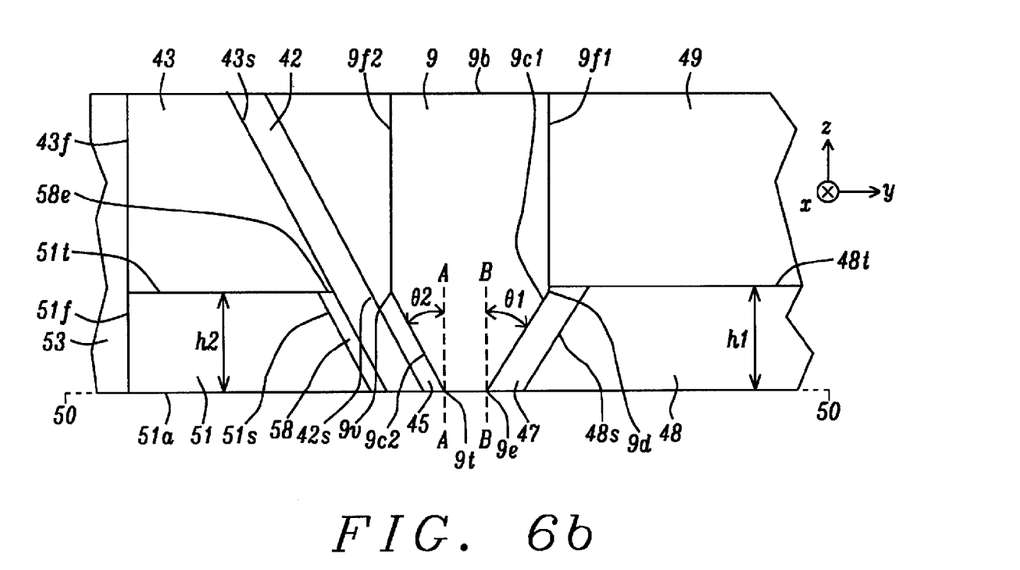
FIG. 6b is a modification of the FIG. 6a embodiment wherein a seed layer is inserted between the high moment trailing shield and (-Ku) trailing shield layer.

Referring to FIG. 6b, the first embodiment may be modified to further include a seed layer 58 formed between side 51s of the anisotropic (-Ku) trailing shield layer and the first trailing shield layer 42. The seed layer is a non-magnetic material such as Ru and has a thickness from about 2 to 5 nm that is employed to facilitate the growth of the anisotropic (-Ku) magnetic layer 51 during the shield fabrication process. Preferably, the seed layer has a side along the ABS, and an end 58e that is formed a distance h2 from the ABS and is coplanar with side 51t of the (-Ku) trailing shield layer.

As mentioned previously, the present disclosure is not limited to main pole shapes having tapered leading and trailing sides. One or both of the top and bottom surfaces of the main pole may be planar and extend from the ABS to a back end of the write head. In the case of a planar bottom surface 9f2 which extends to the ABS, the planes of the write gap 45, and first and second trailing shield layers will also be formed parallel to the main pole bottom surface and perpendicular to the ABS (not shown). Furthermore, side 51s of the (-Ku) trailing shield layer will be aligned perpendicular to the ABS. Likewise, in an embodiment where the main pole has a planar top surface that extends from the ABS to a back end of the write head, then the plane of the leading gap 47 is formed parallel to the top surface 9/1, and side 48s of the anisotropic (-Ku) leading shield is aligned perpendicular to the ABS as appreciated by those skilled in the art.

Figure 7A:
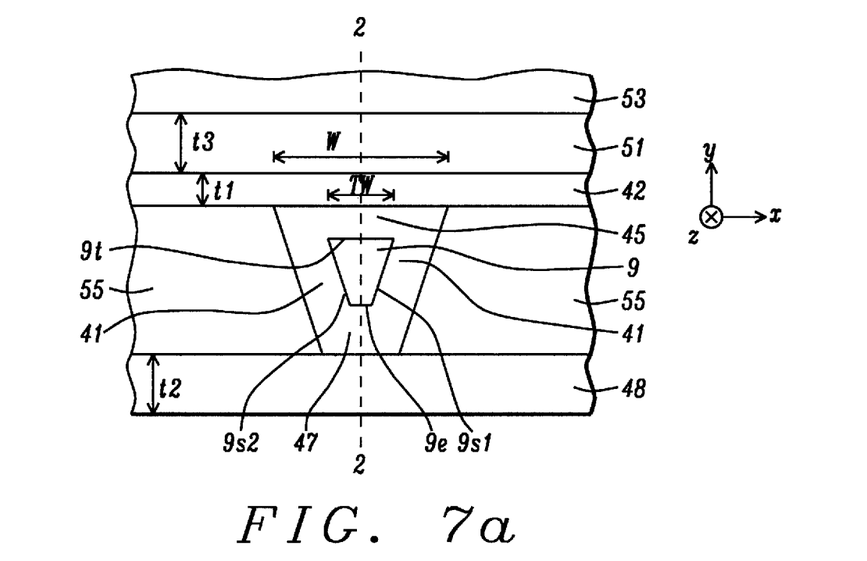

With regard to FIG. 7a, an ABS view is shown of the first embodiment illustrated in FIG. 6a. All features are retained from FIG. 5 except the side shields 55 at the ABS are now made of an anisotropic (-Ku) magnetic material with a c-axis aligned perpendicular to the ABS. Therefore, leading shield 48, side shields 55, and trailing shield portion 51 are all comprised of hcp-CoIr wherein the Ir content is from 10 to 40 atomic %, and preferably between 17 and 22 atomic %, dhcp-CoFe, a'-Fe—C, or NiAs-type $Mn_{50}Sb_{50}$, for example. It should be understood that the anisotropic (-Ku) material in one or more of the aforementioned shields may differ in composition from the other shields. First trailing shield layer 42 is a high moment magnetic layer as described earlier with a down-track thickness t1 of 50 to 100 nm, and preferably about 70 nm. Leading shield 48 has a thickness t2 of 200 to 800 nm and the anisotropic (-Ku) trailing shield layer 51 has a thickness t3 from 300 to 800 nm. Although the main pole shape at the ABS is depicted as a trapezoid, the present disclosure anticipates that alternative shapes may be employed for the main pole while still enjoying the full benefits of the anisotropic (-Ku) shield structure as described herein.

Figure 7B:
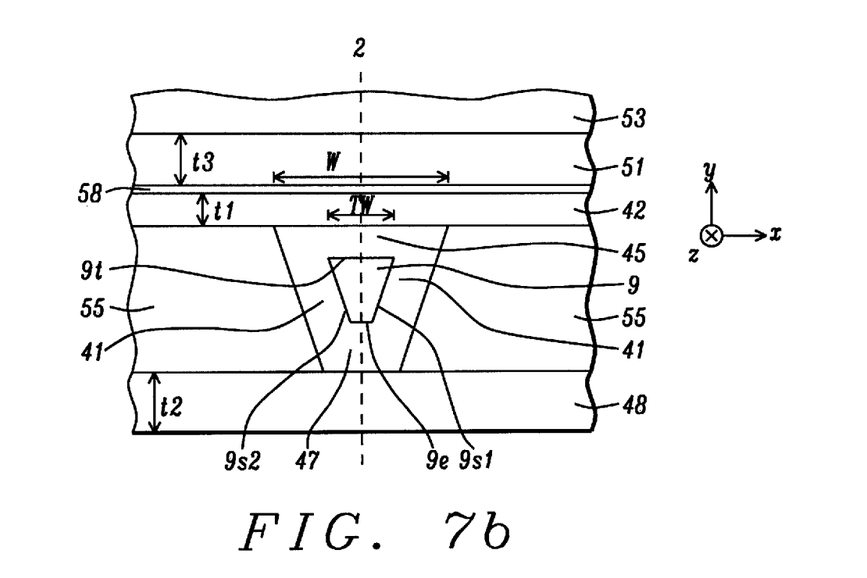
FIG. 7B is an ABS view of the PMR writer structure in FIG. 6b.

In FIG. 7b, there is an ABS view of the modified first embodiment depicted in FIG. 6b. The shield structure is the same as in FIG. 7a except for the non-magnetic seed layer 58 between trailing shield layers 42 and 51.

Figure 8A:
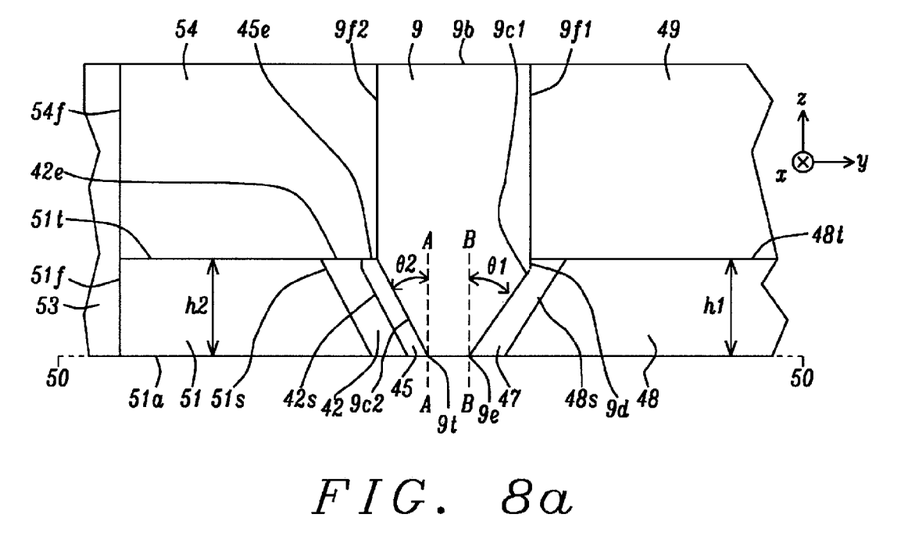
FIG. 8a is a down-track cross-section of a PMR writer formed according to a second embodiment of the present disclosure wherein a leading shield, side shields, and a composite trailing shield surrounding a main pole are all comprised of an anisotropic (-Ku) magnetic material.

Referring to FIG. 8a, a second embodiment of the present disclosure is depicted and is another modification of the first embodiment. In particular, the trailing shield structure that is between side 51t of the anisotropic (-Ku) trailing shield layer and a back end of the write head is replaced with a non-magnetic layer 54 that may be made of alumina, for example. Furthermore, the write gap 45 terminates with an end 45e that is a distance h2 from the ABS 50-50 and is coplanar with side 51t. Likewise, the first trailing shield layer 42 terminates at end 42e that is coplanar with side 51t. In one aspect, the distance h2 is sufficiently large such that the write gap 45 proximate to end 45e extends beyond the tapered trailing side 9c2 and contacts a section of main pole bottom surface 9f2. The present disclosure encompasses a write shield structure wherein h1≧h2 or h2>h1. The ABS view of the second embodiment is the same as illustrated in FIG. 7a.

Figure 8B:
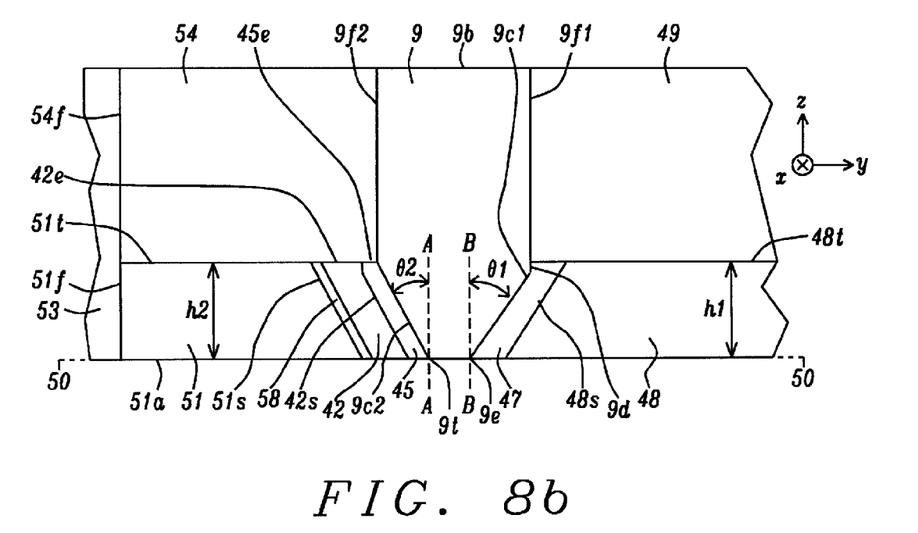
FIG. 8b is a modification of the FIG. 8a embodiment wherein a seed layer is inserted between the high moment trailing shield and (-Ku) trailing shield layer.

Referring to FIG. 8b, an alternative to the shield structure in FIG. 8a is shown wherein the trailing shield is modified to further include a seed layer 58 formed between side 51s of the anisotropic (-Ku) trailing shield layer and the trailing shield layer 42. As in the embodiment depicted in FIG. 6b, the seed layer is a non-magnetic material such as Ru with a thickness from 2 to 5 nm and having an end 58e that is formed a distance h2 from the ABS and is coplanar with side 51t of the anisotropic (-Ku) trailing shield layer. The ABS view of the alternate second embodiment in FIG. 8b is the same as the structure shown in FIG. 7b.

Figure 9:
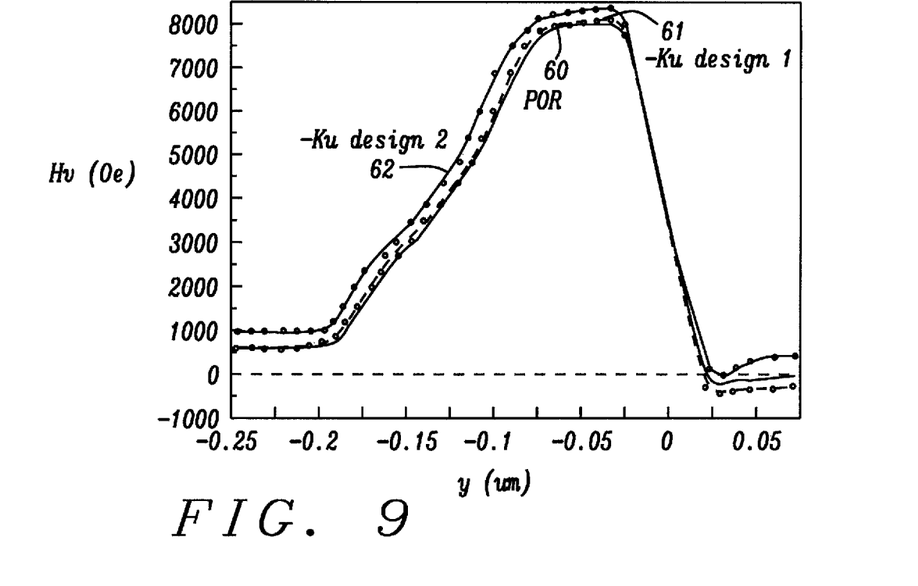

Referring to FIG. 9, down-track field profiles are plotted with the vertical field component (Hv) on the x-axis while the y value on the y-axis is the cross-track field position at the write gap center. Curve 60 represents the POR design depicted in FIGS. 4-5, curve 61 is the result for the first embodiment (FIGS. 6a, 7a), and curve 62 is the result for the second embodiment (FIG. 8a). Actual values are listed in Table 1 and indicate Hv for the first embodiment (design 1) is greater than that for the POR design, and Hv for the second embodiment (design 2) is greater than that for design 1. Thus, both design 1 and design 2 exhibit improved on-track field strength, and design 1 gives the best Hgrad value.

TABLE 1

Magnetic properties of shield designs with anisotropic (-Ku) magnetic layers

| Design | Hv (Oe) | H grad (Oe/nm) | ATE (um²) |
|---|---|---|---|
| POR | 7889 | 249 | 0.79 |
| Design 1 | 8085 | 246 | 0.02 |
| Design 2 | 8372 | 253 | 0.09 |

Figure 10:
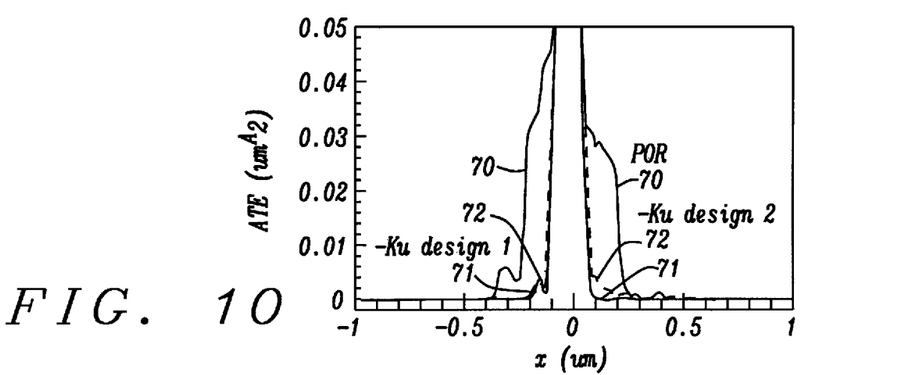
Figure 11:
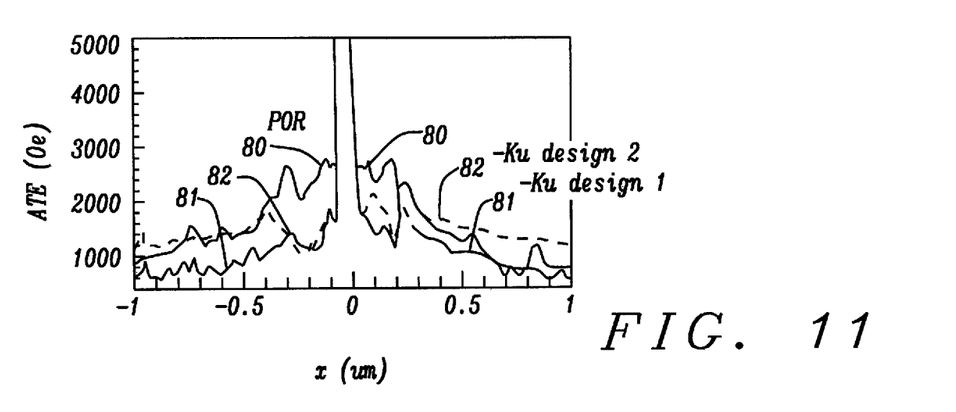

Referring to FIG. 10 and FIG. 11, ATE profiles are shown for the POR shield design as well as designs 1 and 2 that were described earlier as the first embodiment and second embodiment, respectively. The x-axis is the distance in micron from the center of the write track while the y-axis in FIG. 10 is the ATE expressed in units of um². In FIG. 11, the y-axis is ATE in units of Oe. As indicated in Table 1, design 1 delivers the best Hgrad value in terms of (Oe/nm). Furthermore, there is a large reduction in ATE (um²) as listed in Table 1 and observed in FIG. 10 where the ATE for the POR design (curve 70) has a considerably greater width than the ATE width for design 1 (curve 71) and design 2 (curve 72). We expect WATE to be similar to the ATE trend and show a significant improvement for designs 1 and 2 compared with the POR design. With these results, we have demonstrated that an AWA shield comprised of an anisotropic (-Ku) magnetic material in the side shields, leading shield, and in a portion of the trailing shield provides an advantage of improved on-track field strength, and reduced ATE and WATE compared with a POR shield design that contains only an anisotropic (-Ku) leading shield layer. Furthermore, magnetic performance in terms of on-track field strength, ATE, and WATE of the embodiments described herein are expected to be greatly improved over conventional designs wherein shields are made of isotropic magnetic layers such as CoFeNi and CoFe.

Figure 12:
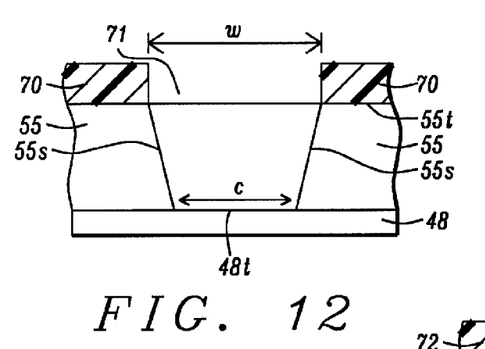
FIGS. 12-15 are a sequence of steps during the fabrication of an anisotropic (-Ku) shield structure according to an embodiment of the present disclosure.

The present disclosure also encompasses a method of forming a shield design according to the embodiments described herein. Referring to FIG. 12, an intermediate structure formed during the fabrication of a composite anisotropic (-Ku) shield structure illustrated in FIG. 7b is shown. A leading shield 48 and side shield layer 55 comprised of anisotropic (-Ku) magnetic layers are sequentially formed on a substrate (not shown) by a conventional plating method. Next, a photoresist layer 70 is coated and patterned by a photolithography method to form an opening 71 along the ABS and extending toward a back end of the device in a direction perpendicular to the ABS. From a top-down view (not shown), the opening has the shape of the main pole layer to be deposited in a subsequent step. An ion beam etch (IBE) process that preferably employs ions (not shown) directed at an angle (non-perpendicular to top surface 55t) is then performed to extend the opening through side shield layer 55 and stop on a top surface 48t of the leading shield. As a result, sidewalls 55s are formed that extend from top surface 55t to top surface 48t wherein the opening between sidewalls 55s has a greater width w at the top than the width c at the bottom.

Figure 13:
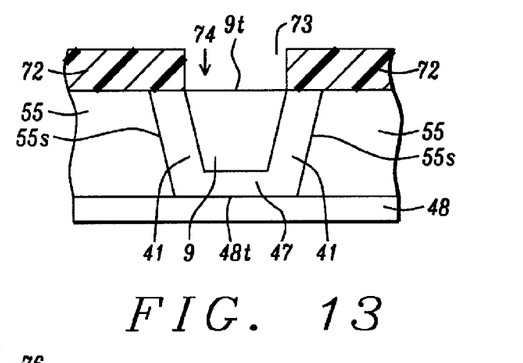

Referring to FIG. 13, an insulation layer is deposited on the sidewalls 55s and bottom to form lead gap 47 on a portion of top surface 48t, and to form side gaps 41 on sidewalls 55s. Thereafter, main pole 9 is plated on side gaps 41 and lead gap 47 to fill the opening. Typically, a chemical mechanical polish (CMP) process is used to remove the first photoresist layer and form a main pole top surface including trailing edge 9t that is essentially coplanar with top surfaces 55t of side shields 55. A second photoresist layer 72 is coated on the side shields, side gaps, and main pole and is then patterned with a photolithography process to form an opening 73 that uncovers a portion of main pole top surface including leading edge 9t. An IBE process that comprises ion beams 74 is employed to taper the trailing side and form a tapered side 9c2 having a taper angle θ2 as depicted in FIG. 6b. Note that the tapered side 9c1 connected to leading side 9f1 may be formed by a standard process after main pole deposition but prior to the patterning process that forms opening 73. Photoresist layer 72 is then removed by a conventional stripping process.

Figure 14:
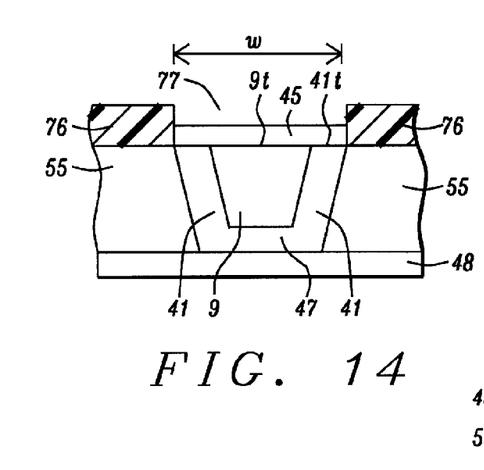

Referring to FIG. 14, a third photoresist layer 76 is coated on the side shields 55, side gap top surfaces 41t, and on the trailing side of main pole 9 and is patterned to form an opening 77 having a width w that uncovers top surfaces 41t and a portion of the main pole proximate to the ABS including trailing edge 9t. Next, a write gap layer is deposited by an atomic layer deposition (ALD) method, for example, to form a conformal write gap 45 on the tapered main pole trailing side (not shown) including trailing edge 9t, and on side gap top surfaces 41t.

Figure 15:
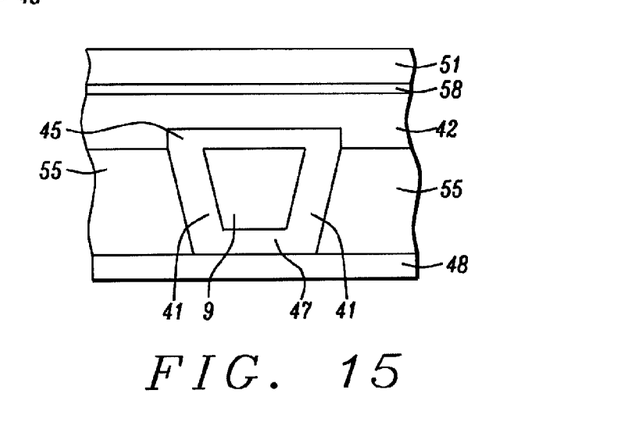

Referring to FIG. 15, the third photoresist layer is removed by a conventional method. Subsequently, a fourth photoresist layer (not shown) is coated and patterned to form an opening that conforms to the desired shape of the trailing shield including first shield layer 42, seed layer 58, and anisotropic (-Ku) layer 51. Layers 42, 58, and 51 are sequentially deposited on write gap 45 and on a top surface of the side shields 55. Seed layer 58 may be a thin layer of Ru with a thickness from 2 to 5 nm to promote the growth of the anisotropic (-Ku) magnetic layer 51. In a preferred embodiment, the anisotropic (-Ku) trailing shield layer is made of $Co_{83}Ir_{17}$ although CoIr with an Ir content between 10 and 40 atomic % is also acceptable. Thereafter, the fourth photoresist layer is removed and a well known process is followed to lay down the return path layer and remaining parts of the write head. Finally, a lapping process is performed to define the ABS and the h1 and h2 distances that the leading shield and anisotropic (-Ku) trailing shield layer extend, respectively, from the ABS, as described previously. In other words, the sides of the leading shield, composite trailing shield, write gap, and leading gap are formed along the ABS 50-50 in FIGS. 6a, 6b, 8a, 8b by the aforementioned lapping process.

The advantages of the AWA shield structure featuring an anisotropic (-Ku) magnetic layer in the leading shield, side shields, and in a composite trailing shield according to the present disclosure are that ATE and WATE are significantly reduced while on-track write field strength and field gradient are improved to enable higher performance in advanced PMR writer designs. In addition, the shield structure may be fabricated using materials and processes that are already used by the industry.

While this disclosure has been particularly shown and described with reference to, the preferred embodiments thereof, it will be understood by those skilled in the art that various changes in form and details may be made without departing from the spirit and scope of this disclosure.

We claim:

1. A perpendicular magnetic recording (PMR) writer, comprising:

(a) a main pole layer comprised of a trailing side and a leading side with respect to a down-track direction, and two sides connecting said leading and trailing sides; the leading side has a leading edge at an air bearing surface (ABS) and the trailing side has a trailing edge at the ABS;

(b) a gap layer adjacent to and surrounding the main pole at the ABS wherein the gap layer includes a write gap along the trailing side and trailing edge, a lead gap along the leading side and leading edge, and a side gap along each of the two sides of the main pole;

(c) a leading shield and side shields adjoining the lead gap and each side gap, respectively, the leading shield and side shields are comprised of an anisotropic (-Ku) magnetic material with a hard axis in a direction perpendicular to the ABS, the leading shield has a first side along the ABS, and a second side formed parallel to the first side and formed a first distance from the ABS; and (d) a composite trailing shield including an isotropic magnetic layer with a moment of about 24 kG adjoining the write gap, and an anisotropic (-Ku) magnetic layer on an opposite side of the isotropic magnetic layer with respect to the write gap, the anisotropic (-Ku) magnetic layer has a first side along the ABS, a second side formed parallel to the ABS at a second distance from the ABS, and a third side adjoining the isotropic magnetic layer, the isotropic magnetic layer extends a distance greater than the second distance from the ABS.

2. The PMR writer of claim 1 wherein the isotropic magnetic layer in the trailing shield has a thickness in a down track direction from about 50 to 100 nm.

3. The PMR writer of claim 1 wherein the leading shield, side shields, and anisotropic (-Ku) trailing shield layer are made of hcp-CoIr wherein the Ir content is between about 10 and 40 atomic %, dhcp-CoFe, a'-Fe—C, or NiAs-type $Mn_{50}Sb_{50}$.

4. The PMR writer of claim 1 wherein the anisotropic (-Ku) trailing shield layer has a thickness in a down-track direction of about 300 to 800 nm.

5. The PMR writer of claim 1 wherein the main pole layer has a tapered leading side at the ABS, and the anisotropic (-Ku) leading shield has a third side formed parallel to the tapered leading side, the third leading shield side connects the first and second leading shield sides.

6. The PMR writer of claim 5 wherein the first distance is greater than a distance of a first end of the tapered leading side from the ABS wherein the first end is a junction where the tapered leading side joins a top surface of the main pole layer.

7. The PMR writer of claim 1 wherein main pole layer has a tapered trailing side at the ABS, and the third side of the anisotropic (-Ku) trailing shield is parallel to the tapered trailing side.

8. The PMR writer of claim 7 wherein the second distance is greater than a distance of a first end of the tapered trailing side from the ABS wherein the first end is a junction where the tapered trailing side joins a bottom main pole surface.

9. The PMR writer of claim 1 further comprised of a Ru seed layer formed between the isotropic magnetic layer in the trailing shield layer and the third side of the anisotropic (-Ku) trailing shield layer.

10. The PMR writer of claim 1 wherein the first distance is about 100 to 500 nm and the second distance is about 150 to 500 nm.

11. A perpendicular magnetic recording (PMR) writer, comprising:

(a) a main pole layer comprised of a trailing side and a leading side with respect to a down-track direction, and two sides connecting the leading and trailing sides; the leading side has a leading edge at an air bearing surface (ABS) and the trailing side has a trailing edge at the ABS;

(b) a gap layer adjacent to and surrounding the main pole at the ABS wherein the gap layer includes a lead gap along the leading side and leading edge, and a side gap along each of the two sides of the main pole, and a write gap along the trailing side and trailing edge, the side gap extends a second distance from the ABS;

(c) a leading shield and side shields adjoining the lead gap and each side gap, respectively, the leading shields and side shields are comprised of an anisotropic (−Ku) magnetic material with a hard axis in a direction perpendicular to the ABS, the leading shield has a first side along the ABS, and a second side formed parallel to the first side and formed a first distance from the ABS; and (d) a composite trailing shield including an isotropic magnetic layer with a moment of about 24 kG that adjoins the write gap, and an anisotropic (−Ku) magnetic layer on an opposite side of the isotropic magnetic layer with respect to the write gap, the anisotropic (−Ku) magnetic layer has a first side along the ABS, a second side formed parallel to the ABS at a second distance from the ABS, and a third side adjoining the isotropic magnetic layer, the isotropic magnetic layer extends a second distance from the ABS and has an end that is coplanar with the second side of the anisotropic (−Ku) trailing shield magnetic layer.

12. The PMR writer of claim 11 wherein the isotropic magnetic layer in the trailing shield has a thickness in a down track direction along the ABS from about 50 to 100 nm.

13. The PMR writer of claim 11 wherein the leading shield, side shields, and anisotropic (−Ku) trailing shield layer are made of hcp-CoIr wherein the Fr content is between about 10 and 40 atomic %, dhcp-CoFe, a'-Fe—C, or NiAs-type $Mn_{50}Sb_{50}$.

14. The PMR writer of claim 11 wherein the anisotropic (−Ku) trailing shield layer has a thickness in a down-track direction of about 300 to 800 nm.

15. The PMR writer of claim 11 wherein the main pole layer has a tapered leading side at the ABS, and the anisotropic (−Ku) leading shield has a third side formed parallel to the tapered leading side, the leading shield third side is connected to an end of each of the first and second sides of the leading shield.

16. The PMR writer of claim 15 wherein the first distance is greater than a distance of a first end of the tapered leading side from the ABS wherein the first end is a junction of the tapered leading side and a top surface of the main pole layer.

17. The PMR writer of claim 11 wherein main pole layer has a tapered trailing side at the ABS, and the third side of the anisotropic (−Ku) trailing shield is parallel to the tapered trailing side.

18. The PMR writer of claim 17 wherein the second distance is greater than a distance of a first end of the tapered trailing side from the ABS wherein the first end is a junction of the tapered trailing side and a bottom surface of the main pole layer.

19. The PMR writer of claim 11 further comprised of a Ru seed layer formed between the isotropic trailing shield layer and the third side of the anisotropic (−Ku) trailing shield layer.

20. The PMR writer of claim 11 wherein the first distance is about 100 to 500 nm and the second distance is about 150 to 500 nm.

21. A method of fabricating a PMR writer having a composite shield structure around a main pole layer at an air bearing surface (ABS), comprising:

(a) sequentially forming a leading shield layer and a side shield layer on a substrate wherein the leading shield layer and side shield layers have an anisotropic (−Ku) magnetic layer composition, the side shield layer has an opening formed therein which is bounded on the sides by side shield sidewalls, and along the bottom by a top surface of the leading shield layer;

(b) depositing a side gap along the side shield sidewalls, and a leading gap on the top surface of the leading shield layer;

(c) plating a main pole layer on the side gap and leading gap to fill the opening in the side shield layer, and planarizing a top surface of the main pole to be coplanar with a top surface of the side shield layer, a surface of the main pole layer that interfaces with the leading gap is a leading side of the main pole layer;

(d) depositing a write gap on the side gap and on the main pole top surface which is a trailing side of the main pole layer;

(e) forming a composite trailing shield by sequentially depositing an isotropic magnetic layer and an anisotropic (−Ku) magnetic layer on the write gap; and (f) performing a lapping process to define the ABS, a first side of the leading shield along the ABS, and a first side of the composite trailing shield along the ABS, the leading shield has a second side formed parallel to the ABS that is a first distance from the ABS, and the anisotropic (−Ku) trailing shield layer has a second side formed parallel to the ABS that is a second distance from the ABS.

22. The method of claim 21 wherein the anisotropic (−Ku) trailing shield layer has a thickness from about 300 to 800 nm in a down-track direction along the ABS, and is made of hcp-CoIr wherein the Ir content is between about 10 and 40 atomic %, dhcp-CoFe, a'-Fe—C, or NiAs-type $Mn_{50}Sb_{50}$.

23. The method of claim 21 further comprised of depositing a Ru seed layer on the isotropic trailing shield layer before forming the anisotropic (−Ku) trailing shield layer.

24. The method of claim 21 further comprised of forming a taper on the leading side of the main pole before depositing the write gap, the tapered leading side has an end formed a third distance from the ABS wherein the third distance is less than the first distance.

25. The method of claim 21 further comprised of forming a taper on the trailing side of the main pole before depositing the write gap, the tapered trailing side has an end formed a fourth distance from the ABS wherein the fourth distance is less than the second distance.

26. The method of claim 21 wherein the leading shield has a thickness from about 200 to 800 nm in a down-track direction.

27. The method of claim 21 wherein the isotropic magnetic trailing shield layer has a thickness of about 50 to 100 nm in a down-track direction.

28. The method of claim 24 wherein the leading gap has an end formed parallel to the ABS and at a first distance from the ABS.

29. The method of claim 25 wherein the write gap has an end formed parallel to the ABS and at a second distance from the ABS.

30. The method of claim 29 wherein the isotropic magnetic layer in the trailing shield has an end formed parallel to the ABS and at a second distance from the ABS.

31. The method of claim 21 wherein the isotropic magnetic layer in the trailing shield and the write gap extend a distance greater than the second distance from the ABS.

* * * * *